United States Patent
Ochoa De Eribe Martínez et al.

(10) Patent No.: US 12,172,750 B2
(45) Date of Patent: Dec. 24, 2024

(54) ENGINE COMPRISING A MOVABLE AERODYNAMIC COMPONENT

(71) Applicant: Lilium eAircraft GmbH, Wessling (DE)

(72) Inventors: Xabier Ochoa De Eribe Martínez, Wessling (DE); Iñigo Ugarte Eizmendi, Wessling (DE); Amar Bansal, Wessling (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 17/672,015

(22) Filed: Feb. 15, 2022

(65) Prior Publication Data

US 2022/0281594 A1    Sep. 8, 2022

(30) Foreign Application Priority Data

Mar. 5, 2021  (EP) .................................... 21161128

(51) Int. Cl.
*B64C 29/00*    (2006.01)
*B64C 13/30*    (2006.01)
(Continued)

(52) U.S. Cl.
CPC .......... *B64C 29/0033* (2013.01); *B64C 13/30* (2013.01); *B64C 13/32* (2013.01);
(Continued)

(58) Field of Classification Search
CPC ..... B64C 29/00; B64C 29/0033; B64C 13/30; B64C 13/32; B64C 11/00; B64D 33/04;
(Continued)

(56) References Cited

U.S. PATENT DOCUMENTS 6,808,140 B2   10/2004  Möller
7,458,221 B1*  12/2008  Arnold .................... F02K 3/075
                                                         181/213
(Continued)

FOREIGN PATENT DOCUMENTS

CN      108 688 803 A      10/2018
DE    10 2018 122280 A1     3/2019
(Continued)

OTHER PUBLICATIONS

European Search Report for EP 21 161 128.0. Mailed Aug. 31, 2021. 10 pages.
(Continued)

*Primary Examiner* — Elton K Wong
(74) *Attorney, Agent, or Firm* — Meunier Carlin & Curfman LLC

(57) ABSTRACT

The present invention provides an engine of a vertical take-off and landing aircraft, wherein the engine is configured to be movable with respect to an aircraft component of the aircraft between a hover position for take-off and landing, and a cruise position for forward flight, wherein the engine comprises an aerodynamic component having at least one aerodynamic element movable between a first position and a second position the aerodynamic element defining an aerodynamic surface in contact with an airstream passing through the engine.

9 Claims, 4 Drawing Sheets

(51) Int. Cl.
  *B64C 13/32* (2006.01)
  *B64D 27/24* (2024.01)
  *B64D 33/04* (2006.01)
  *F02K 5/00* (2006.01)

(52) U.S. Cl.
  CPC ............ *B64D 27/24* (2013.01); *B64D 33/04* (2013.01); *F02K 5/00* (2013.01); *F05D 2220/323* (2013.01)

(58) Field of Classification Search
  CPC ............ B64D 27/24; F02K 5/00; F02K 1/11; F05D 2220/323
  See application file for complete search history.

(56) References Cited

U.S. PATENT DOCUMENTS

| | | | |
|---|---|---|---|
| 10,570,926 B2 | 2/2020 | Maciolek | |
| 2013/0099065 A1* | 4/2013 | Stuhlberger | B64C 27/22 903/902 |
| 2017/0203839 A1* | 7/2017 | Giannini | B64D 27/24 |
| 2019/0217937 A1 | 7/2019 | Wiegand | |
| 2020/0354049 A1* | 11/2020 | Noppel | B64D 29/02 |
| 2022/0018309 A1* | 1/2022 | Wylie | F02C 7/20 |
| 2022/0126996 A1* | 4/2022 | Long | B60L 3/0092 |
| 2022/0348320 A1* | 11/2022 | Van Der Meer | B64C 29/0033 |

FOREIGN PATENT DOCUMENTS

| | | |
|---|---|---|
| EP | 3909851 A1 | 11/2021 |
| GB | 967780 A | 8/1964 |
| WO | 2017/123699 A1 | 7/2017 |
| WO | 2020/186305 A1 | 9/2020 |

OTHER PUBLICATIONS

International Search Report and Written Opinion in connection to PCT/EP2022/054368, dated May 9, 2022.

Office Action issued for the corresponding European patent application No. 21161128.0, dated Oct. 10, 2023.

Registered Letter in connection to the corresponding European patent application No. 21161128.0, dated Oct. 10, 2023.

* cited by examiner

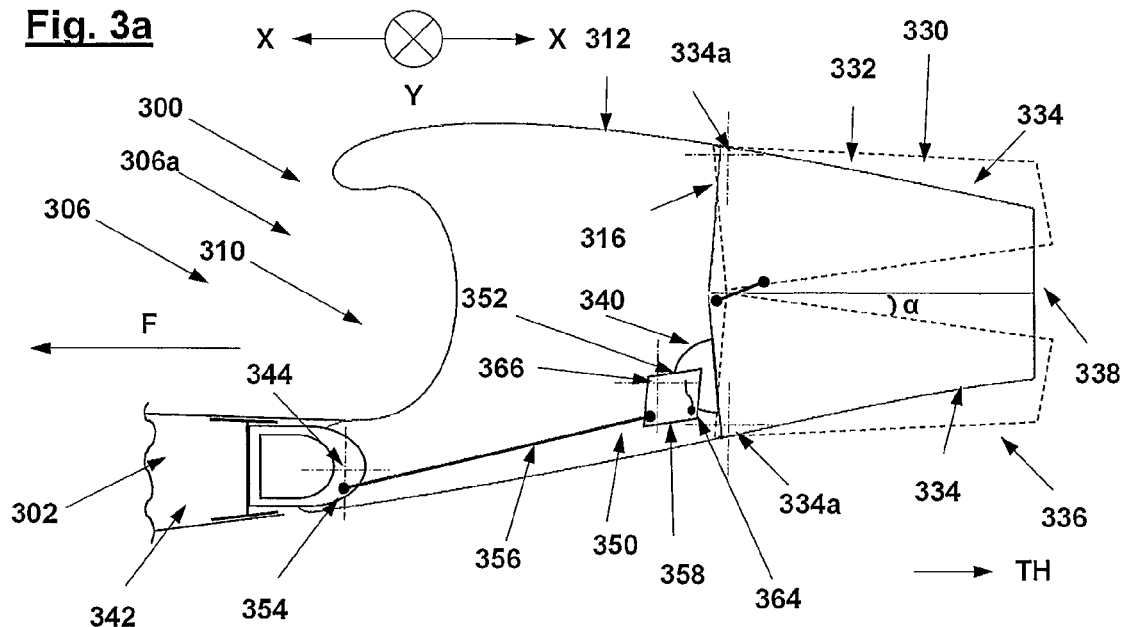
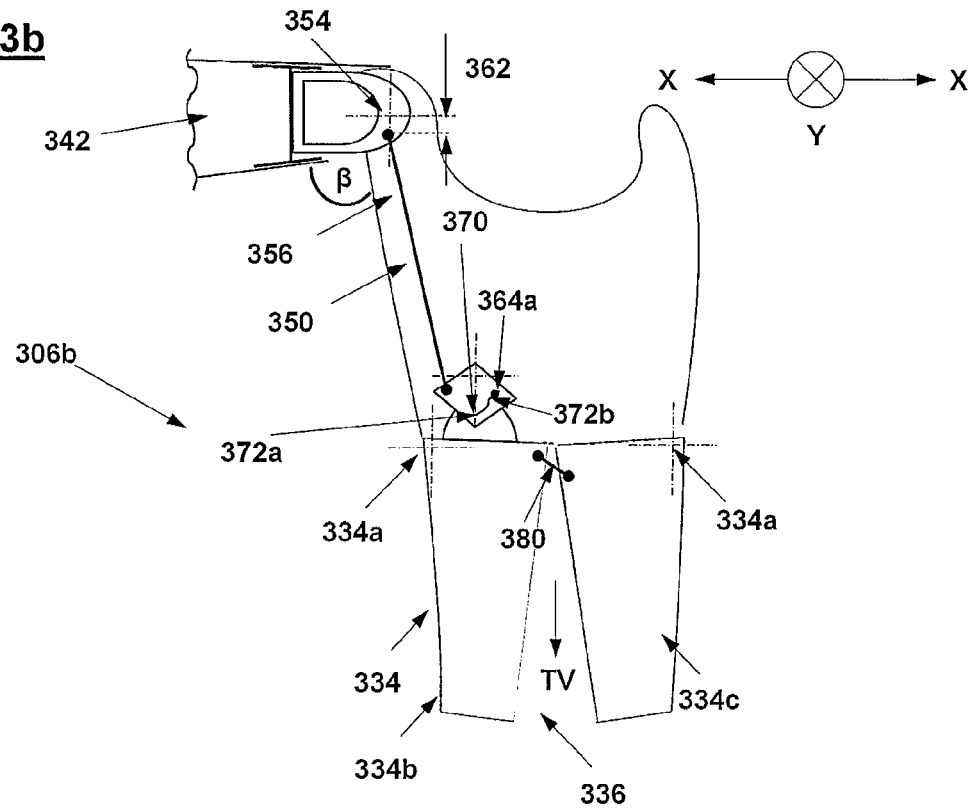

ENGINE COMPRISING A MOVABLE AERODYNAMIC COMPONENT

FIELD OF THE INVENTION

The present invention relates to an engine of a vertical take-off and landing aircraft, wherein the engine is configured to be movable with respect to an aircraft component of the aircraft between a hover position for take-off and landing, and a cruise position for forward flight, and wherein the engine comprises an aerodynamic component having at least one aerodynamic element defining an aerodynamic surface in contact with an airstream passing through the engine. Furthermore, the present invention relates to a vertical take-off and landing aircraft comprising such an engine.

BACKGROUND

Vertical take-off and landing aircrafts (VTOL aircrafts) have gained increased attraction during the last years for their capabilities to start and land at areas of limited size, such as urban areas. Extensive research and development work has been dedicated to the optimization of the engines of VTOL aircrafts to increase the efficiency and performance of the engines in both hover mode (for take-off and landing) and cruise mode (for forward flight). One of the challenges in the design of VTOL aircraft engines is that the aerodynamics of the engine, such as the shape of the inner wall of the duct, and flow areas at intake and exhaust portions, the shape and angle of the rotor and stator blades, etc. can only be optimized for a single flow condition. However, especially in a VTOL aircraft, operating requirements and load of the engines both strongly differ between hover mode during take-off and landing on the one hand and cruise mode during forward flight on the other hand. As a result, engines of VTOL aircraft are usually oversized to allow reliable operation in both modes.

As an example for varying the aerodynamic conditions within an engine by movable aerodynamic elements, variable area exhaust nozzles have been used in the past for gas turbine engines of conventional jet planes, which vary the exhaust nozzle area of the engine such as to optimize flow conditions for different flight situations. This may lead to a reduction of energy consumption while enabling generation of thrust adapted to the specific demands of a specific flight situation. In particular, a variable area exhaust nozzle may adapt the static pressure at an exhaust portion of the engine in order to create optimized flow conditions for different operating conditions. Conventionally, variable area exhaust nozzles are adjusted by dedicated actuators.

U.S. Pat. No. 4,176,792 A discloses a convergent-divergent nozzle comprising a four-bar linkage system and a plurality of servo actuators for a plurality of jaws to vary the exhaust nozzle area. Such a variable area exhaust nozzle has a plurality of complex coupling components and consumes a significant amount of fuel due to its high weight.

Another variable area exhaust nozzle for an engine is known from U.S. Pat. No. 10,570,926 B2 and comprises jaws adjusted by dedicated actuators under consideration of the flight mode. Again, the actuators add substantial weight to the airplane and increase fuel consumption. Further, the nozzle has a significant demand for installation space.

Therefore, it is an object of the present invention to provide an engine having improved aerodynamic conditions in different operating modes, while limiting complexity and/or weight.

SUMMARY

This object is achieved by an engine of a vertical take-off and landing aircraft, wherein the engine is configured to be movable with respect to an aircraft component of the aircraft between a hover position for take-off and landing, and a cruise position for forward flight, wherein the engine comprises an aerodynamic component having at least one aerodynamic element movable between a first position and a second position, the aerodynamic element defining an aerodynamic surface in contact with an airstream passing through the engine, wherein the engine is configured to set the aerodynamic element to the first position when the engine assumes the hover position, and to set the aerodynamic element to the second position when the engine assumes the cruise position. Thus, according an important feature of the present invention, an aerodynamic element is provided which is movable in accordance to the flight mode, such as to allow changing of the aerodynamic conditions within the engine and adapting the air flow for an optimized operation of the engine in both hover mode and cruise mode. In particular, moving the aerodynamic element moves the aerodynamic surface, for example its angle relative to the incoming airflow or the angle at which the airflow collides with the aerodynamic surface. In addition or alternatively, moving the aerodynamic element may change the flow area or aerodynamic cross section of the engine or a portion of the engine such as to change operational characteristics of the engine in accordance to the flight mode. The aerodynamic component may therefore be adjusted such as to ensure equal or similar flow coefficients and reduced friction losses, and the operation in effective operating points for the engine in both hover mode and in cruise mode.

In a preferred embodiment of the invention, the engine may comprise a transmission having a first end connected to the aerodynamic component and a second end adapted to be connected to the aircraft component, wherein the transmission is adapted to translate a movement of the engine with respect to the aircraft component into a movement of the at least one aerodynamic element. Accordingly, in a vertical take-off and landing aircraft using such engine, movement of the engine between cruise position and hover position may be directly transmitted to the aerodynamic element of the aerodynamic component such as to move the aerodynamic element. As a result, the aerodynamic component may be set to the suitable configuration for the particular flight mode (hover or cruise). As a first advantage of the transmission, a separate actuator for driving the aerodynamic component can be omitted such that complexity and weight of the engine can be reduced. As the transmission may be a fully mechanical device, additional electrical or electro-mechanical components, such as an actuator control system, may be avoided. As a second advantage of the transmission, since the movement of the aerodynamic component is determined by the movement of the engine, one degree of freedom with respect to control and testing can be dispensed with, which leads to a reduction of controlling effort and an improved safety. Additionally, the testing of every position of the aerodynamic component for every position of the engine is not required anymore, so the testing effort significantly decreases as well.

The aircraft component relative to which the engine is movably mounted may be an airfoil, such as a wing or a canard, or may be a fuselage of an aircraft or a component fixed to an airfoil or a fuselage of an aircraft. Therefore a structure which is fixed relative to the main carrier of the aircraft is preferably chosen as a reference point of controlling the movement of the aerodynamic component.

In a preferred embodiment of the invention, the range of movement of the engine with respect to the aircraft component between hover position and cruise position comprises a first range and a second range, wherein the transmission is configured such as to have a first transmission ratio when the engine moves within the first range, and to have a second transmission ratio lower than the first transmission ratio when the engine moves within the second range. Therefore, the transmission is provided with different transmission ratios depending on the position of the engine relative to the aircraft component. For example, even if the engine pivots from hover mode to cruise mode with constant angular speed, an associated pivoting movement of the aerodynamic element may be performed with two or more different speeds, depending on the position of the engine. The position of the aerodynamic component may thus be set as desired for each position of the engine.

Furthermore, the range of movement of the engine with respect to the aircraft component between hover position and cruise position may comprise an idle range, wherein movement of the engine within the idle range is not transformed to a movement of the aerodynamic element. In particular, the position of the aerodynamic element relative to the engine may be fixed during movement of the engine within the idle range. In this way, adjustment of the aerodynamic component may be adapted within intermediate states between hover position and cruise position.

In order to implement the function of the idle range with simple mechanical means, the aerodynamic element or the transmission may remain in abutment with a mechanical stop for fixing the position of the aerodynamic element with respect to the engine in the idle range, and/or the transmission may comprise an elastic member, which is arranged to accommodate movement of the engine with respect to the aircraft component within the idle range, such that the movement of the engine is not translated into a movement of the aerodynamic component.

The transmission may preferably comprise linkage means, e.g. a rod and/or a cam mechanism, more particular a slotted cam. Especially when using a cam mechanism, by virtue of choosing a specific shape of a cam surface of the cam mechanism (such as a shape of a slot of a slotted cam), the movement of the aerodynamic element can be predefined as being dependent on the relative position between the engine and the aircraft component. Furthermore, the aerodynamic element may be biased towards the first position or towards the second position by an elastic member, e.g. an extension spring, such as to move the aerodynamic element by using simple mechanical means.

In another embodiment of the invention, the aerodynamic component comprises a first aerodynamic element and a second aerodynamic element, wherein the first and second aerodynamic elements are connected to one another by a link mechanism, preferably comprising a linkage and/or a slotted cam, such that movement of the first aerodynamic element drives movement of the second aerodynamic element. Thus, the transmission may just drive a first aerodynamic element, while a second aerodynamic element (or any additional aerodynamic elements) may be driven by said first aerodynamic element through the link mechanism. Therefore an additional transmission or actuator for the second aerodynamic element (or any further aerodynamic element) may be dispensed with.

According to another embodiment of the invention, the engine may comprise an aerodynamic control device adapted to control movement of the aerodynamic element based on movement of the engine with respect to the aircraft component. As a result, the movement of the aerodynamic element is directly connected to the movement of the engine between hover position and cruise position by virtue of dedicated control through the control device. Dedicated control in this sense means that the control device operates on an electronic level and/or hardware level which ensures, at least in a normal (non-emergency) operational state of the aircraft, that operation of the control device cannot be overruled by a flight computer of the aircraft and/or by pilot commands. In this way, one degree of freedom with respect to control and testing can be dispensed with, which leads to a reduction of controlling effort and an improved safety. Additionally, the testing of every position of the aerodynamic component for every position of the engine is not required anymore, so the testing effort significantly decreases as well.

For example, the control device may be connected to receive signals from an engine mode actuator driving a movement of the engine between hover position and cruise position. In addition or alternatively, the control device may be part of or connected to a transmission, such as the transmissions described in the various embodiments above.

In a preferred embodiment of the invention, the aerodynamic component is a variable area exhaust nozzle mounted to an exhaust portion of the engine, and wherein the aerodynamic element is a baffle plate or a jaw of the variable area exhaust nozzle adapted to deflect an exhaust air flow of the engine and define an exhaust area of the engine. By adjusting the exhaust area of the engine, the static pressure within the engine may be adapted to the current load and to the particular flight mode such as to allow operation of the engine at equal or at least similar effective operating points both during hovering and during cruise.

More particular, if the aerodynamic element may be a general C-shaped jaw when viewed in a thrust direction of the engine, which allows the jaw to at least partially surround the exhaust area. For example, two jaws of general C-shape may define the exhaust area and allow changing the exhaust area between an open position and a closed position of the nozzle, when the jaws are arranged such that their C-shapes face one another. Furthermore, depending on the particular C-shape of the at least one jaw, the exhaust area may be configured in a circular form or, alternatively, in a generally polygonal form, for example in a generally rectangular form. In order to reduce turbulences, the generally polygonal form may have rounded edges.

It has been found that the engines and thus the aircraft achieve an optimum performance, if a ratio between a cruise exhaust nozzle area, i.e. an exhaust cross-sectional area in the closed position of the nozzle, and the hover exhaust nozzle area, i.e. an exhaust cross-sectional area in the open position of the nozzle, is within a range from 0.53 to 0.76, preferably in a range from 0.61 to 0.69, most preferably is set to 0.65.

In another embodiment of the invention, the aerodynamic component may be a rotor of the engine, adapted to be rotated relative to a stator about an engine rotational axis, wherein the aerodynamic element is a rotor blade of the rotor, wherein the rotor blade is preferably mounted to a hub portion of the rotor such as to be moveable between the first position and the second position. In particular, the rotor blade may be pivotably mounted to the hub portion with a pivot axis oriented radially to the engine rotational axis. Thus an angle of the rotor blade with respect to the incoming air flow may be adjusted to allow the flow conditions to be adapted to the desired load and/or the particular flight mode.

The invention further provides a vertical take-off and landing aircraft comprising aircraft components such as a fuselage, wings etc., and one or more engines configured according to the embodiments of the invention as described above. The vertical take-off and landing aircraft may comprise an airfoil and a plurality of engines, preferably more than 5 engines, more preferably more than 10 engines, mounted adjacent to one another to the airfoil such as to form a row to allow air streams of adjacent engines to merge and support one another. This achieves distributed propulsion.

Each of the engines may be pivotable with respect to the airfoil independently from the other engines. In particular, each engine may be pivoted relative to the airfoil to assume a position (angle with respect to the airfoil) which is different from that of the other engines, especially different from that of its adjacent engines or all other engines. In this way, maneuverability and redundancy of operation can be enhanced.

Alternatively, an engine arrangement carrying a plurality of engines, for example 3 engines, fixed thereto may be used to allow pivoting the plurality of engines in unison by pivoting the engine arrangement. Furthermore, such engine arrangement may have one common variable area exhaust nozzle, such as the exhaust areas of all engines of the plurality of engines are controlled by a common variable area exhaust nozzle. The plurality of engines of an engine arrangement may be arranged in a row, especially in a row extending in lateral direction, such that the engines are placed side-by-side adjacent to one another.

In all embodiments of the invention the at least one engine or the at least one engine arrangement may be mounted to a trailing edge of the airfoil, in order to provide control over the aerodynamic loads on the wing. Furthermore the at least one engine or the at least one engine arrangement may be mounted at an upper portion of the airfoil such as to control an air flow over the upper side of the airfoil.

BRIEF DESCRIPTION OF THE SEVERAL VIEWS OF THE DRAWINGS

The invention will be described in more details with respect to specific embodiments referring to the enclosed drawings, in which:

FIGS. 3a and 3b show a variable area exhaust nozzle in a closed position (FIG. 3a) and an open position (FIG. 3b) according to a third embodiment of to the present invention.

DETAILED DESCRIPTION

Throughout the present disclosure, directions usually refer to a situation when the aircraft is parking or flying parallel to the ground. This means, a heading direction X of the aircraft extends along the roll axis of the aircraft, a lateral direction Y extends horizontally along a lateral axis (pitch axis) of the aircraft, and a vertical direction Z extends upwards along a vertical axis (yaw axis) of the aircraft.

Figure 1:
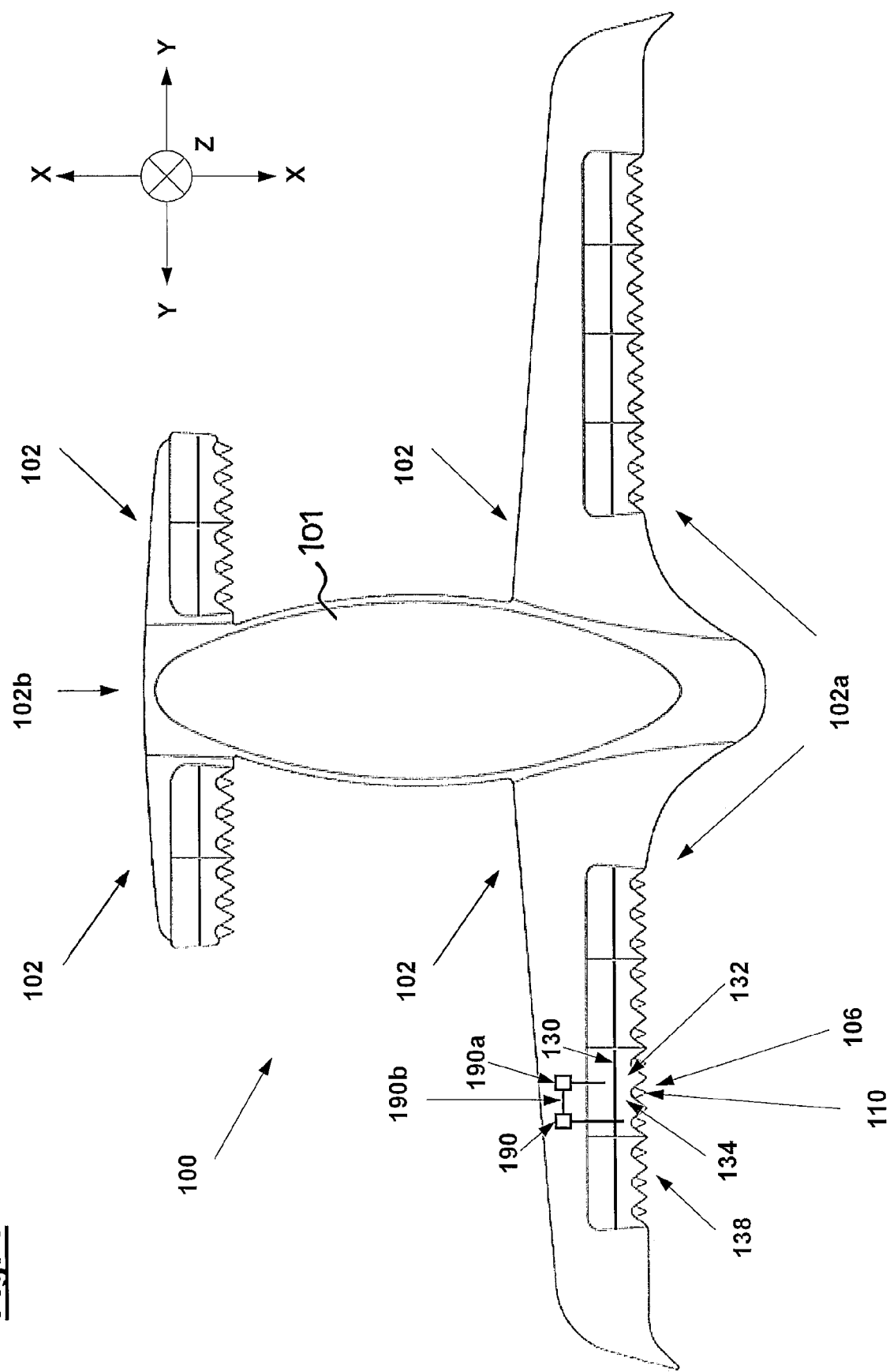
FIG. 1 shows a schematic layout of an aircraft equipped with an engine arrangement and a variable area exhaust nozzle according to a first embodiment of the present invention.

In FIG. 1, a vertical take-off and landing aircraft (VTOL aircraft) is generally denoted by reference numeral 100. Aircraft 100 comprises a fuselage 101 and airfoils 102, for example a pair of wings 102a arranged at a rear portion of fuselage 101 and a pair of canards 102b at a front portion of fuselage 101. Each airfoil 102 carries at least one, preferably a plurality of engine arrangements 106, each comprising at least one engine 110, in particular an electric engine, such as an electric ducted fan. In the illustrated example, each engine arrangement 106 includes three engines 110.

A plurality of engines 110, preferably more than 5 engines, may be arranged adjacent to one another in a row such as to allow air streams of adjacent engines to merge and support one another and thus form a continuous stream having a relatively large width in lateral direction. In the illustrated example, each of the rear wings 102a carries more than 10, in particular 12 engines, wherein each of the canards 102b carries more than 5, in particular 6 engines, resulting in a total number of more than 30, in particular exactly 36 engines, such that the aircraft can be operated with high redundancy, high efficiency and low noise.

Each engine arrangement 106 is pivotably mounted to its airfoil 102 such as to be able to pivot about a lateral engine pivot axis between a hover position suitable for take-off and landing, in which a thrust direction of the at least one engine 110 of the engine arrangement 106 is oriented in vertical direction Z, and a cruise position suitable for forward flight, in which a thrust direction of the at least one engine 110 of the engine arrangement 106 is oriented substantially parallel to the heading direction X.

According to the first embodiment of the invention, each engine arrangement 106 comprises a variable area exhaust nozzle 130 mounted to an exhaust portion of the engine arrangement 106. The variable area exhaust nozzle 130 preferably comprises a jaw arrangement 132 having at least one movable jaw 134, preferably two jaws, adapted to move between an open position defining a relatively large exhaust nozzle area, and a closed position defining a relatively small exhaust nozzle area.

Preferably, one engine arrangement has only one variable area exhaust nozzle 130, such that in a case that one engine arrangement 106 includes a plurality of engines, for example three engines 110, the exhaust areas of all engines are controlled by a common variable area exhaust nozzle.

According to a preferred feature of the present invention, the movement of the engine 110 between hover position and cruise position is translated into a movement of the at least one jaw arrangement 132 between the open position and the closed position. In the first embodiment, this translation may be affected by a control device 190 of the variable area exhaust nozzle 130. Said control device 190 may be interconnected to a control device 190a of the engine 110 with an interconnection unit 190b. That interconnection unit 190b may be an electrical connection or a signaling connection. In this case, the jaw arrangement 132 is adjusted by a dedicated actuator, which is controlled in dependence of the movement of the engine 110 by the control device 190. However, the same function could be achieved by an electromechanical connection or a mechanical connection.

The at least one jaw is movable between an open position and a closed position. The engines according to FIG. 1 are in a cruise position with horizontal thrust direction. The jaws 134 of the jaw arrangement 132 are in a closed position.

The variable exhaust nozzle 130 can be moved to define different exhaust nozzle areas, in particular, a cruise exhaust nozzle area when set to a closed or cruise configuration, and a hover exhaust nozzle area, when set to an open or hover configuration. By changing the exhaust nozzle area between the cruise exhaust nozzle area and the hover exhaust nozzle area, the static pressure at the exhaust portion is varied and therefore the aerodynamic characteristics can be adapted in cruise and hover position. The engine 110 may therefore efficiently be operated as desired, in particular at about similar performance operating points and/or at similar flow conditions during both, cruise and hover flight. It has been found that the engines and thus the aircraft achieve an optimum performance, if a ratio between the cruise exhaust nozzle area and the hover exhaust nozzle area is within a range from 0.53 to 0.76, preferably in a range from 0.61 to 0.69, most preferably is set to 0.65.

Figure 2A:
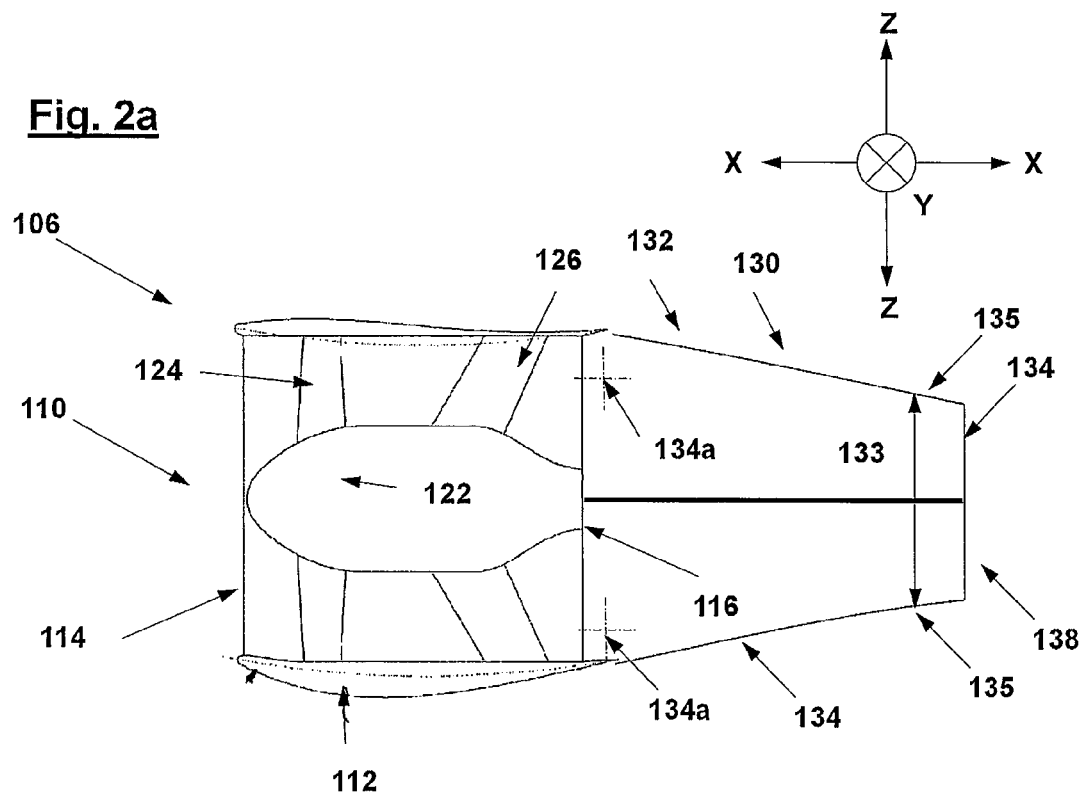
FIGS. 2a and 2b show cross sectional views of engine arrangements equipped with variable area exhaust nozzles according to the first embodiment and according to a second embodiment of the present invention, respectively.

FIG. 2a shows details of the engine arrangement of the first embodiment 106 in a cruise position. The engine 110 comprises an engine housing 112 elongating in heading direction X from an inlet portion 114 to an exhaust portion 116. Within the engine housing 112, a rotor 122 having rotor blades 124 and stator blades 126 are arranged. The stator blades 126 hold the rotor 122 in the center of the engine housing 112.

Adjacent to the exhaust portion 116, the variable area exhaust nozzle 130 is mounted to the engine housing 112. The variable area exhaust nozzle 130 comprises the jaw arrangement 132 having the at least one jaw 134 movable around a jaw pivot axis 134a, which may be arranged in the lateral direction Y. The jaw pivot axis 134a is illustrated with a dot-dashed cross. The jaw arrangement 132 is movable between an open position 136 (not shown) and a closed position 138.

In the closed position 138, two adjacent jaws 134 may be in abutment to each other in essentially vertical direction Z. Further, a distance 133 between a peripheral surface 135 of the adjacent jaws 134 is decreasing from an end at an exhaust portion 116 to an opposite end in a direction of the roll axis X. The at least one jaw 134 may be formed with a C-shaped cross section when viewed in direction of the roll axis X.

Figure 2B:
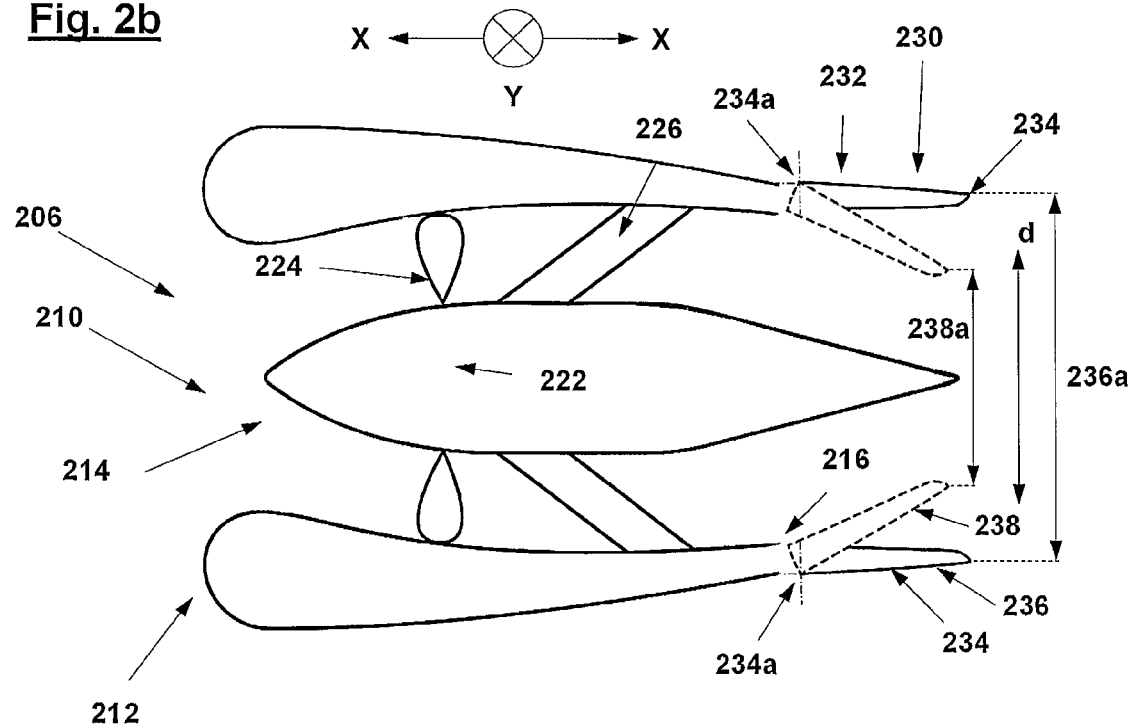

A second embodiment of an engine arrangement and a variable area exhaust nozzle is shown in FIG. 2b, which substantially corresponds to the embodiment of FIG. 2a. Therefore, in FIG. 2b, analogous parts are provided with the same reference numerals as in FIG. 2a, but increased by 100. For example, a closed position 238 illustrated in FIG. 2b corresponds to the closed position 138 as shown in FIG. 2a. Further, the engine arrangement 206 and the variable area exhaust nozzle 230 are only described in the following insofar as it differs from the variable area exhaust nozzle 130 and the engine arrangement 106 of the first embodiment in FIG. 2a, and reference is made to the description of the first embodiment with respect to all other features and functions.

The engine arrangement 206 comprises an engine housing 212 elongating from an inlet portion 214 to an exhaust portion 216. Further, the engine housing 212 houses a rotor 222 having rotor blades 224 and stator blades 226.

Adjacent to the engine housing 212, a variable area exhaust nozzle 230 is arranged. The variable area exhaust nozzle 230 comprises a jaw arrangement 232 having at least one jaw 234 movable around a jaw pivot axis 234a. This jaw pivot axis 234a may be arranged in lateral direction Y.

According to the second embodiment, the jaw arrangement may have two jaws 234, approaching each other in a closed position 238, represented with dashed lines, and a closed distance or cruise exhaust nozzle area 238a is formed in between. The jaw arrangement 232 in an open position 236, marked by a solid line, forms an opened distance or hover exhaust nozzle area 236a between the two jaws 234. The at least one jaw 234 may have a substantially trapezoid shape viewed in lateral direction Y.

The exhaust nozzle areas 238a, 236a are determined by the shape of the cross-section of the variable area exhaust nozzle and a distance d. The variable area exhaust nozzle 230 may have a rectangular cross-section viewed in the direction of the roll axis X.

FIGS. 3a and 3b show a third embodiment of the variable area exhaust nozzle, which substantially corresponds to the first and second embodiments of FIGS. 2a and 2b. Therefore, in FIGS. 3a and 3b, analogous parts are provided with the same reference numerals as in FIG. 2a, but increased by 200 and as in FIG. 2b, but increased by 100, respectively (e.g. jaw pivot axis 334a analogous to jaw pivot axis 134a and jaw pivot axis 234a, aircraft 300 to aircraft 100 and engine arrangement 306 to engine arrangement 106).

Further, the variable area exhaust nozzle 330 is only described in the following insofar as it differs from the variable area exhaust nozzle 130 of FIG. 2a and from the variable area exhaust nozzle 230 of FIG. 2b.

The jaw arrangement 332 of the third embodiment comprises at least one jaw 334 mounted with a mounting portion 340 to the exhaust portion 316 of an engine 310, respectively an engine housing 312. The mounting portion 340 may be a hinge or a linkage or the like. The at least one jaw 334 is movable between an open position 336, indicated by a dashed line, and a closed position 338, indicated by a solid line.

With reference to FIGS. 3a and 3b, in a cruise position 306a, the thrust direction TH of the engine 310 may be parallel to the heading direction X or the roll axis or may be inclined to the heading direction X or the roll axis by an angle smaller than 15 degree. Further, in a hover position 306b, the thrust direction TV of the engine 310 may be parallel to the vertical direction Z or may be inclined to the vertical axis Z by an angle smaller than 15 degree. If the engine 310 rotates from the cruise position 306a to the hover position 306b, the at least one jaw 334 moves from a closed position 338 to an open position 336.

The engine 310 is movable with respect to an aircraft component 342 around an engine pivot axis 344. This movement of the engine 310 may be driven in a well-known manner by a motor (not shown).

In order to translate the movement of the engine 310 to a movement of the at least one jaw 334 a transmission 350 is provided, which comprises a linkage means 356 and a cam mechanism 358. For example, the linkage means 356 is a rod and the cam mechanism 358 is a slotted cam. Said transmission 350 is connected with a first end 352 to the jaw arrangement 332 and with a second end 354 to the aircraft component 342, which may be an airfoil 302 of the aircraft 100.

At the second end 354, the linkage means 356 is connected to the aircraft component 342 by a hinge joint in an offset distance 362 to the engine pivot axis 344. Said linkage means 356 is connected to the cam mechanism 358 by another hinge joint. Said cam mechanism 358 is connected to the at least one jaw 334. The cam mechanism 358 is movable around a cam axis 366, which is indicated with a dot-dashed cross.

The engine 310 is movable with respect to the aircraft component 342 by about 90° between a hover position, as shown in FIG. 3b, and a cruise position, as depicted in FIG. 3a. When the engine 310 moves around the engine pivot axis 344, the linkage means 356 also performs a movement. Due to the hinge joint, the cam mechanism 358 is rotated around the cam axis 366, when the engine 310 is rotated.

According to the third embodiment, the cam mechanism 358 comprises a slotted cam 370 and a pin 364a, which are in engagement with each other. The pin 364a is in a fix connection to the jaw arrangement 332. As the slotted cam 370 moves, the pin 364a accomplishes a movement according to the shape of the slot of the slotted cam 370. This movement results in a movement of the jaw arrangement 332 and the at least one jaw 334. During manufacturing of the engine, the shape of the slot may for example be designed by rotating the jaw 334 (for example in a simulation or geometric calculation) to the desired angles for each position of the engine between cruise mode and hover mode, and determining the corresponding path of the pin 364a which thus defines the path of the slot. In operation, the pin 364a is then forced to follow this path when the engine is pivoting.

The cam mechanism 358, in particular the slot of the slotted cam 370, may comprise a first portion 372a having a first shape defining a first transmission ratio and a second portion 372b having a second shape defining a second transmission ratio. Movement of the pin 364a within the first portion 372a may lead to a movement of jaws 334 with higher speed, movement of the pin 364a within the second portion 372b may lead to a movement of jaws 334 with lower speed. This means that, as far as movement of the engine 310 with respect to the aircraft component 342 is concerned, there is provided a first range, for example at or near the cruise position, in which the jaws 334 open or close with relatively high speed, while in a second range, for example at or near the hover position, the jaws 334 open or close with relatively low speed. As a result, the speed of the movement of the jaws 334 is not strictly linear to the movement of the engine, but may differ for different positions of the engine. Consequently an exhaust nozzle area is determined in dependence of an opening angle α of the jaws 334 and with respect to an engine angle β between the aircraft component 342 and the engine 310.

Furthermore, the slot of the slotted cam 370 may comprise a third portion (not shown), in which the slot follows a circular section of constant radius around the cam axis 366, such that relative movement between the slotted cam 370 and the pin 364a within the circular section does not lead to a movement of the pin 364a about the jaw axis 334a and hence, keeps the angular position of the jaws 334 fixed with respect to the engine 310. In other words, as long as the pin 364a moves within the third portion of the slot, movement of the engine 310 with respect to the aircraft component 342 is not translated into a movement of the jaws 334.

The jaw arrangement 332 may comprise a plurality of jaws, e.g. two jaws 334b, 334c. These jaws 334b, 334c may be connected to one another by a link mechanism 380. Said link mechanism 380 may be a hinge fixed with the jaws 334b, 334c. The movement of one jaw 334b is transmitted to the at least one other jaw 334c via the link mechanism 380. Thus, both jaws 334b, 334c move, e.g. from the closed position 338 into the open position 336, in accordance with and driven by the movement of the engine 310. Movement of both jaws 334b, 334c may be essentially simultaneous. Alternatively, both jaws 334b, 334c may be opened and closed in a staggered manner.

Figure 4:
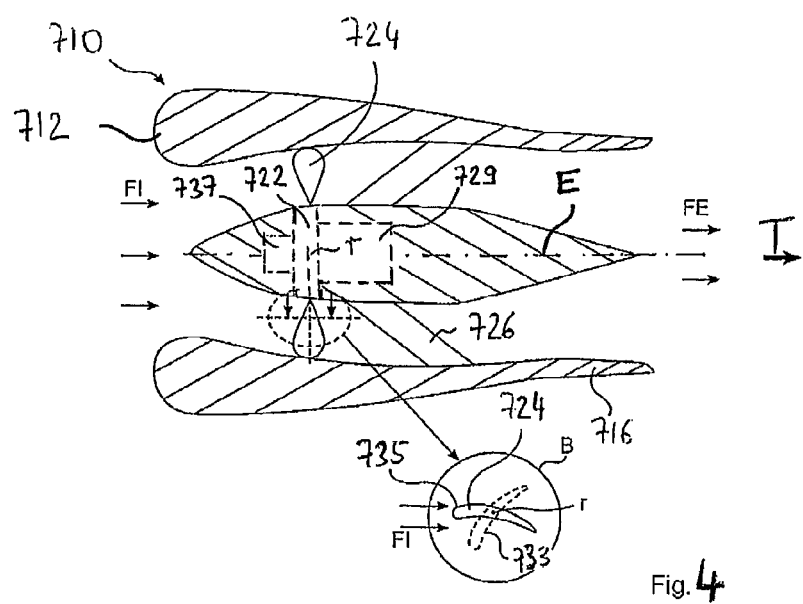
FIG. 4 shows a cross section of an engine according to a fourth embodiment of the present invention.

FIG. 4 shows an engine according to a fourth embodiment of the present invention. In this embodiment, engine 710 comprises a substantially cylindrical duct 712 defining a central engine axis E corresponding to the thrust direction T. An inner surface of duct 712 is preferably designed to optimize air flow characteristics and reduce noise of the engine 710. The outer surface of duct 712 may be designed to assist lift such that the engine forms part of the lifting structure of the aircraft, together with the wings.

Engine 710 further comprises a stator 726 fixed to duct 712, which carries a hub portion 727 at the center of duct 712. Hub portion 727 includes an electric motor 729, which drives a rotor 722 for rotation about engine axis E. Rotor 722 includes rotor blades 724 extending between the hub portion 727 and the inner surface of duct 712, such that rotation of the blades 724 propels an intake airflow FI in thrust direction T through the engine 710. The airflow exits the engine 710 at an exhaust portion 716 of the duct 712 to form an exhaust airflow FE.

According to the invention, in the fourth embodiment, the rotor 722 forms an aerodynamic component in the sense of the present invention, and at least one, preferably all of the rotor blades 724 form aerodynamic elements in the sense of the present invention. In particular, at least one rotor blade 724 may be movable such as to change an inclination of the blade with respect to the intake airflow FI as shown in the enlarged drawing B in FIG. 4. In particular, in cruise mode, an angle between the blade 724 and the intake airflow FI may be larger as depicted in dashed lines 733 in the enlarged drawing B, whereas in hover mode, an angle between the intake airflow FI and the blade 724 may be smaller as shown in solid lines 735 in the enlarged drawing B. For changing the angle, blades 724 may be mounted to be rotatable around its longitudinal axis r, which may be a radial axis with respect to the central engine axis E.

By changing the angle between the blade 724 and the intake airflow FI as described above, the static pressure within engine 710 may be changed and thus, the engine 710 may efficiently be operated at about similar effective operating points and/or similar flow conditions during both cruise and hover flight.

Furthermore, movement of the rotor blade 724 between cruise mode and hover mode may be driven by an actuator 737, such as an electromechanical element connected to a control device. Preferably, actuator 737 receives a control signal from an engine control device (not shown) controlling movement of the engine between cruise mode and hover mode, such that movement of the rotor blade 724 is directly correlated to movement of the engine and thus the flight mode of the aircraft. This operational correlation is preferably established on a hardware level or a lower software level that does not require any pilot interaction or any commands from the flight computer of the aircraft, or a hardware level or a lower software level that even ensures that operation cannot be changed in any manner by the pilot or the flight computer.

As an alternative to a dedicated electromechanical actuator, movement of the rotor blade(s) 724 between cruise mode and hover mode may be driven by the pivoting movement of the engine 710 through a transmission, for example a transmission using a rod, a cam mechanism or a pulley mechanism.

In some embodiments, a variable area exhaust nozzle as used in the other embodiments may be omitted and the exhaust portion may have a constant exhaust area in both hover mode and cruise mode. Alternatively, both, adjustable rotor blades and a variable area exhaust nozzle could be used in combination.

The invention claimed is:

1. A vertical take-off and landing aircraft, comprising an aircraft component and a plurality of engine arrangements mounted adjacent to one another to the aircraft component such as to form a row, wherein each of the plurality of engine arrangements comprises at least one electric engine, and is pivotable with respect to the aircraft component independently from any of the other engine arrangements of the plurality of engine arrangements, wherein each engine arrangement is configured to be movable with respect to the aircraft component of the aircraft between a hover position for take-off and landing, and a cruise position for forward flight, wherein:

- each of the engines comprises an aerodynamic component having at least one aerodynamic element movable between a first position and a second position, the aerodynamic element defining an aerodynamic surface in contact with an airstream passing through the engine, wherein each of the engines comprise a transmission having a first end connected to the aerodynamic component and a second end adapted to be connected to the aircraft component, wherein the transmission is adapted to translate a movement of the engine with respect to the aircraft component into a movement of the at least one aerodynamic element,
- wherein each engine is configured to set the aerodynamic element to the first position when the engine arrangement assumes the hover position, and to set the aerodynamic element to the second position when the engine arrangement assumes the cruise position,
- wherein the at least one aerodynamic element comprises a first aerodynamic element and a second aerodynamic element, wherein the first and second aerodynamic elements are connected to one another by a link mechanism comprising a linkage and/or a slotted cam, such that movement of the first aerodynamic element drives movement of the second aerodynamic element,
- wherein the linkage is a hinge fixed with the first aerodynamic element and the second aerodynamic element, and wherein the transmission is configured to just drive the first aerodynamic element, while the second aerodynamic element is configured to be driven by the first aerodynamic element through the link mechanism.

2. The vertical take-off and landing aircraft according to claim 1, wherein the aircraft component is an airfoil or a fuselage of the aircraft, or a component fixed to an airfoil or a fuselage of the aircraft.

3. The vertical take-off and landing aircraft according to claim 1, wherein the range of movement of each engine arrangement with respect to the aircraft component between hover position and cruise position comprises an idle range, wherein movement of each engine arrangement within the idle range is not transformed to a movement of the aerodynamic element.

4. The vertical take-off and landing aircraft according to claim 1, wherein the transmission comprises linkage means, said linkage means comprising a rod and/or a cam mechanism.

5. The vertical take-off and landing aircraft of claim 4, wherein the cam mechanism comprises a slotted cam.

6. The vertical take-off and landing aircraft according to claim 1, wherein the aerodynamic element is biased towards the first position or towards the second position.

7. The vertical take-off and landing aircraft according to claim 1, wherein movement of the aerodynamic element is controlled based on movement of the engine with respect to the aircraft component.

8. The vertical take-off and landing aircraft of claim 1, wherein the plurality of engine arrangements comprises more than five engine arrangements.

9. The vertical take-off and landing aircraft of claim 1, wherein the plurality of engine arrangements comprises more than ten engine arrangements.

* * * * *